Dec. 31, 1957     B. M. BROWNELL     2,817,981
METHOD OF MAKING A CUTTING DIE
Filed April 20, 1955
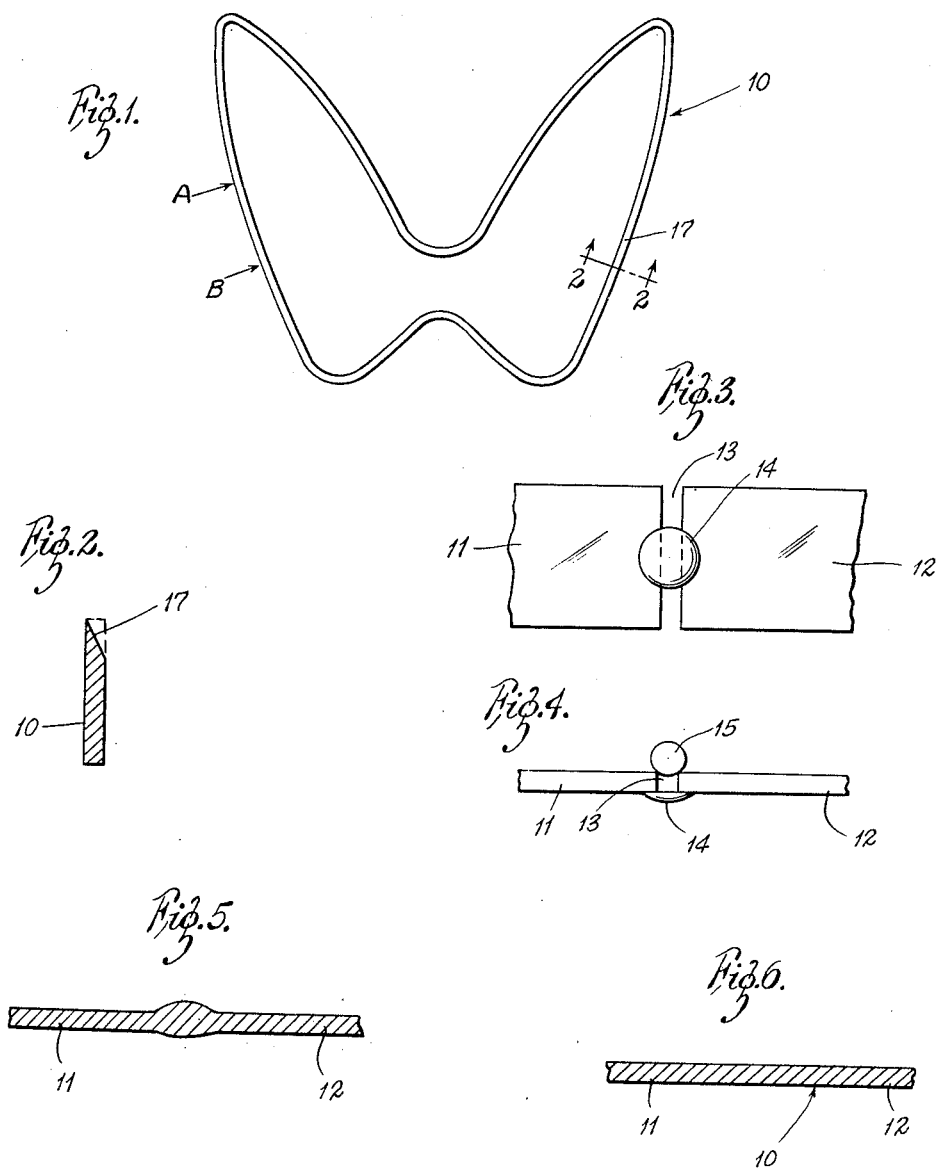
INVENTOR:
BARNETT M. BROWNELL
BY Kingsland, Rogers & Ezell
ATTORNEYS

United States Patent Office 2,817,981
Patented Dec. 31, 1957

2,817,981

METHOD OF MAKING A CUTTING DIE

Barnett M. Brownell, University City, Mo., assignor to Central Die & Supply Corporation, St. Louis, Mo., a corporation of Missouri Application April 20, 1955, Serial No. 502,686

1 Claim. (Cl. 76—107)

The present invention relates to a method of making a cutting die. More particularly, the invention can be applied to a die for cutting shoe parts in irregular shapes, although it is not intended to be limited only to such dies. In a broader aspect, it relates to a method for closing the two adjacent ends of strip material, especially the ends of a strip used to form a die, so as to render the two ends integral without altering the overall dimensions or characteristics of the strip material, or of the die.

Heretofore, various methods have been practiced for joining the ends of the strips of which dies of this kind are made. One of the principal difficulties has been that welds or like arrangements for uniting the ends of the strip have distorted the strip so that the dimensions of the die are changed. For instance, the welding of the two ends of the strip causes such temperature changes as to elongate the ends of the strip and distort the shape of the die. Other welding changes the composition of the strip in the area of the weld.

A number of attempts have been made to overcome the foregoing problem. One that has been employed is to secure the die strip around the edge of a plate that has the shape of the cut-out portion of the die, and after the strip is firmly secured to the plate, to weld the adjacent ends of the strip together. The plate itself is designed to maintain the dimensions of the die despite the concentration of heat at the weld. This method, however, is cumbersome and expensive.

The present invention has for its object to provide a method for making welds of the foregoing type which is much less expensive than those methods heretofore used, and which produces a die that is less bulky and clumsy than the foregoing, yet which holds its dimensions. Other objects of the invention will appear from the description to follow.

In the drawing:

Figure 1 is a plan view of a die of characteristic shape used in the manufacture of shoe uppers;

Figure 2 is an enlarged transverse section through the die on the line 2—2 of Figure 1;

Figure 3 is a view on an enlarged scale of the unclosed abutting ends of the die strip in an early stage of the process of closing the same, the view being taken between the points A and B of Figure 1;

Figure 4 is a view similar to Figure 3 but showing a subsequent stage in the process;

Figure 5 is a longitudinal section through the same part of the die strip at a stage in the method after that shown in Figure 4; and Figure 6 is a view similar to Figure 5 after the joint has been completed.

The die 10 in Figure 1 is shown merely to illustrate a most important use of the present invention. This die is of typical die shape for use in the manufacture of shoe uppers, it, of course, being understood that the particular shape is unimportant. The die 10 is preferably formed of a strip of tool steel. As illustrated by the dotted lines in Figure 2, the strip 10 initially may be ordinary rectangular strip material without any especial sectional shape, although it may be made in special sectional shapes if desired.

As shown in Figure 3, the two ends 11 and 12 of the strip are brought toward each other in alignment, but leaving a gap 13 between them. Then some means is used to provide a connecting element 14 to tie the two ends 11 and 12 firmly together. This connecting element preferably is a tack weld, but other types of permanent integral backing or connecting means for backing and securing the two ends 11 and 12 may be used, such as a connecting strap spot welded to each end. This connection firmly and permanently establishes the relative positions of the ends 11 and 12, and the size of the gap 13, in a way that can resist large breaking stresses to which later stages in the process subject the joint. However, the connection must be one that does not subject the ends to such heat or pressure-induced strains that the strip will be distorted out of its initial dimensions. Hence, a quick tack weld or the like applied to a small area of the strip is contemplated.

Thereafter, a rod or the like 15 is laid across the opposite side of the gap 13, and the assembly put between the electrodes of a resistance welder, so that the rod is fused and mashed into the gap 13 and is welded to the ends of the strips 11 and 12. The use of resistance welding in place of gas or arc welding eliminates the change in composition of metal in the welded area, and especially avoids carbon oxidation.

After the weld, there is an automatic chill of the joint and a controlled reheating of the weld to temper the welded metal, as known in the metallurgy arts, in one continuous automatic operation without removing the die from the welding machine.

It is of importance that the rod 15 have the same analysis as the die stock. With this condition, the tempering aforesaid minimizes and usually eliminates any porosity or cracks after welding and after any subsequent heat treating.

After the foregoing steps, the joint may have the appearance of Figure 5, in which the gap is filled and in which there may be some excess material around the joint. This may be ground off as required, either in a separate stage or in the stage at which the cutting edge 17 is put onto the die strip.

In dies of the foregoing kind, typical dimensions would have the strip of high carbon tool steel $1/16$ inch to $1/8$ inch thick. The material could be $9/16$ inch to $3/4$ inch wide. The rod 15 may be about $3/16$ inch or less in diameter, which is somewhat larger than the gap 13. These dimensions are, of course, given only for illustration.

Normally, it is preferable to provide the gap 13 with some substantial width, because if the joint is butted, there is more likelihood of expanding the adjacent ends of the strip and distorting the overall die. However, with the use of the tie button 14, or its equivalent tying strap, welded to the two ends 11 and 12 by spot welding, the two ends 11 and 12 may be held so securely that the expansion aforesaid cannot distort the die, even with the gap 13 minimized, or even with the two ends in physical abutment. In some cases, the two ends may be abutted and tied by welding them directly together by such means as an arc or gas tacking, without the strap or connecting element, and then fusing the rod into the joint. This, however, is not the preferred method.

It has been found that this method provides a die stock or die that is relatively cheap to make, and yet which is preferable to the former dies made by other methods.

What is claimed is:

In a method of making a cutting die including welding the ends of a piece of cutting steel strip together in such wise as to prevent modification of the dimensions and character of the steel, the steps of: bending a steel strip into the desired shape of the die and bringing the ends of the steep strip to face one another in approximately contiguous relationship, welding them into such predetermined relationship by adding metal to span across from one to the other and welding the metal to both over a limited area inwardly from the lateral edge of the strip that is to become the cutting edge thereof, by a quick application of electric welding current to such limited area, thereby permanently and fixedly uniting them against separation without detriment to the said lateral edge of the strip; thereafter applying a mass of fusible steel to the adjacent ends of the two strips, then resistance-welding the steel to the two ends to make of them a unitary strip, and finally shaping the aforesaid lateral edge of the strip into a cutting edge.

References Cited in the file of this patent

UNITED STATES PATENTS

| | | |
|---|---|---|
| 984,719 | Thomson | Feb. 21, 1911 |
| 1,718,746 | Lougheed | June 25, 1929 |
| 1,917,901 | Rohlfing | July 11, 1933 |
| 2,182,796 | Deming | Dec. 12, 1939 |
| 2,265,943 | Laig | Dec. 9, 1941 |

FOREIGN PATENTS

| | | |
|---|---|---|
| 112,958 | Switzerland | Dec. 18, 1924 |